(12) United States Patent
Koos et al.

(10) Patent No.: US 7,972,519 B2
(45) Date of Patent: Jul. 5, 2011

(54) PURIFICATION DEVICE, INSERT AND METHOD OF PURIFYING A LIQUID

(75) Inventors: Paul Koos, Höör (SE); Robert Hahmann, Stockholm (SE); Paulina Koos, Höör (SE)

(73) Assignee: Nordaq Water Filter Systems AB, Stockholm (SE)

( * ) Notice: Subject to any disclaimer, the term of this patent is extended or adjusted under 35 U.S.C. 154(b) by 1129 days.

(21) Appl. No.: 11/631,321

(22) PCT Filed: Jul. 1, 2005

(86) PCT No.: PCT/SE2005/001103
§ 371 (c)(1),
(2), (4) Date: Jan. 3, 2007

(87) PCT Pub. No.: WO2006/004539
PCT Pub. Date: Jan. 12, 2006

(65) Prior Publication Data
US 2007/0251887 A1 Nov. 1, 2007

(30) Foreign Application Priority Data
Jul. 2, 2004 (SE) ...................................... 0401752

(51) Int. Cl.
*C02F 1/461* (2006.01)

(52) U.S. Cl. ..................... 210/748.01; 422/186; 422/22; 210/663

(58) Field of Classification Search .................. 210/663, 210/192, 266; 422/22, 186
See application file for complete search history.

(56) References Cited

U.S. PATENT DOCUMENTS

| 260,725 | A | | 8/1952 | Butler |
| 2,607,725 | A | * | 8/1952 | Butler ........................... 204/248 |
| 4,780,215 | A | * | 10/1988 | Carlson ......................... 210/722 |
| 4,935,116 | A | | 6/1990 | LeMire |
| 5,061,367 | A | | 10/1991 | Hatch et al. |
| 5,064,534 | A | * | 11/1991 | Busch et al. .................. 210/266 |
| 5,082,568 | A | | 1/1992 | Holler |
| 5,149,437 | A | | 9/1992 | Wilkinson et al. |
| 5,443,735 | A | | 8/1995 | Kirnbauer et al. |
| 6,120,686 | A | | 9/2000 | Bilz |
| 6,287,450 | B1 | | 9/2001 | Hradil |

FOREIGN PATENT DOCUMENTS

| DE | 3131498 A * | 3/1983 |
| DE | 4308390 | 9/1993 |
| GB | 9396 A | 4/1915 |
| JP | 0924367 | 1/1997 |

OTHER PUBLICATIONS

English Abstract of JP 0924367.
English Abstract of DE 4308390.

* cited by examiner

*Primary Examiner* — Walter D Griffin
*Assistant Examiner* — Cameron J Allen
(74) *Attorney, Agent, or Firm* — Dykema Gossett PLLC

(57) ABSTRACT

The present invention relates to a purification device for the purification of a liquid such as water, preferably drinking water, which purification device comprises at least one casing (1) having at least one insert (10), said casing (1) having at least one inlet (8) and at least one outlet (9) for the liquid and said insert (10) comprising at least one filter (15) located in a flow path of the liquid. The purification device comprises at least one galvanic couple (12, 14) located in said flow path. The present invention also relates to an insert and a method of purifying a liquid.

32 Claims, 4 Drawing Sheets

PURIFICATION DEVICE, INSERT AND METHOD OF PURIFYING A LIQUID

BACKGROUND OF THE INVENTION

1. Field of the Invention

The present invention relates to a purification device for the purification of a liquid such as water, preferably drinking water, which purification device comprises at least one casing having at least one insert, said casing having at least one inlet and at least one outlet for the liquid and said insert comprising at least one filter located in a flow path of the liquid. The invention also relates to an insert for the use in the purification device as well as a method of purifying a liquid.

2. Prior Art

U.S. Pat. No. 5,082,568 shows a method of removing low concentrations of metal impurities from water. An expedient device is also evident from the publication. A cylindrical core of activated carbon is arranged in a cylindrical container. The water flows radially through the core and into a longitudinal channel in the centre of the core, from where it is led further out. The activated carbon surrounds an antibacterial ion-exchange resin. The efficiency in purification; however, is not optimal and the flow rate of the water is relatively low.

SUMMARY OF THE INVENTION

A first object of the present invention is to provide a purification device that purifies a liquid such as water more efficient than known devices. A second object is to provide a purification device that enables a greater flow rate of the liquid than what applies for known devices.

The objects are attained by a purification device for the purification of a liquid such as water, preferably drinking water, which purification device comprises at least one casing having at least one insert, said casing having at least one inlet and at least one outlet for the liquid and said insert comprising at (east one filter located in a flow path of the liquid. The purification device comprises at least one galvanic couple located in said flow path.

Said galvanic couple may consist of at least two nets of metal located at a distance from each other. At least a first one of said nets may be of copper and at least a second one of said nets may be of zinc.

An alternative method of providing a desired polarization in a closed galvanic circuit is to replace the internal galvanic circuit by a circuit fed from an external power supply. In this case, the consuming anode, i.e. the net, e.g. of zinc or magnesium, is replaced by a net of a material that is not consumed. The cathode may either consist of a net, preferably of acid-proof stainless steel, or of the filter vessel in itself. The choice of anode material is made among non-toxic electrode materials having suitable excess voltage so that the desirable polarization can be attained. The choice is critical so far that no significant current passage is desired since the polarization in itself gives a sufficient bactericidal effect. Valve metals have, e.g., the requisite properties. Examples of valve metals are titanium, zirconium, niobium, tantalum and others. The choice of electrode material is dictated by the desired polarisation effect. In the choice of external power supply, there is a plurality of possibilities, two of which are described here. One is to use a conventional rectifier connected to a conventional electric mains. Another possibility is to use a generator, which is described below as well as in the detailed part of the description. A fixed power supply however is preferable, especially if the filter is used intermittently. In both cases, the power supply is supplemented by a control loop adjustable for different voltages depending on the different choices of material in the interval of 2-15 V. Preferably, a voltage of 2-4 V is used for a net of titanium.

At least one first pre-filter may be present in said flow path. Said at least one first pre-filter may be present before said galvanic couple in said flow path. Said at least one first pre-filter may be of cellulose material having a porosity that allows particles having a size of approx. 5.0-15.0 µm (micron), preferably approx. 5.0 µm, to pass through.

At least one second pre-filter may be present in said flow path. Said at least one second pre-filter may be present between said nets in said flow path. Said at least one second pre-filter may consist of at least one compact piece (block) pervious to the liquid and manufactured from powdered activated carbon impregnated with silver and mixed with thermoplastic adhesive. Said at least one second pre-filter may have a porosity that allows particles having a size of approx. 0.8-5.0 µm, preferably approx. 1.0 µm, to pass through and said carbon may be impregnated with approx. 0.3% silver.

Said at least one filter may be located after said galvanic couple in said flow path. Said at least one filter may consist of at least one compact piece (block) pervious to the liquid and manufactured from powdered activated carbon impregnated with silver and mixed with thermoplastic adhesive. Said at least one filter may have a porosity that allows particles having a size of approx. 0.2-0.4 µm, preferably approx. 0.3 µm, to pass through and said carbon may be impregnated with approx. 0.3% silver.

At least one space with ion-exchange resin may be present in said flow path. Said space may be present after said galvanic couple in said flow path.

Said insert may, in addition to said filter, also comprise said first and second pre-filters and said galvanic couple. Said insert may be of an essentially cylindrical shape and be provided with at least one top plate impervious to the liquid and of an essentially circular shape that covers essentially the entire top surface of the cylindrical shape and at least one bottom plate impervious to the liquid and of an essentially circular shape that covers essentially the entire bottom surface of the cylindrical shape, wherein, however, said top plate may be provided with a through hole essentially centrally located. Each one of said at least one first pre-filter, at least one first net, at least one second pre-filter, at least one second net and at least one filter may have an essentially ring-shaped cross section and said at least one space with ion-exchange resin may have a circular cross section, whereby said components may be placed concentrically within each other in said insert allowing the liquid that is to be purified to pass through said at least one inlet into said casing and further essentially radially into, through and out of said insert as well as further through said at least one outlet out of said casing, whereby the liquid upon the passage thereof through said insert in turn can pass through said at least one first pre-filter, at least one first net, at least one second pre-filter, at least one second net, at least one filter and at least one space with ion-exchange resin.

The purification device may have a control equipment that comprises at least one pressure gauge for the inlet side of the liquid, at least one pressure gauge for the outlet side of the liquid, at least one generator for a rechargeable battery and driven by liquid flow through the purification device, at least one rechargeable battery, at least one indicator of LED type or the like, at least one signal-processing equipment as well as at least one equipment for communication via GSM, GPRS, 3G, radio, tele and/or the like.

Thus, the invention also comprises an insert for the use in a purification device according to the above and comprising at least one filter located in a flow path of a liquid. The insert comprises at least one galvanic couple located in said flow path.

Said galvanic couple may consist of at least two nets of metal located at a distance from each other. At least a first one of said nets may be of copper and at least a second one of said nets may be of zinc. At least one first pre-filter may be present in said flow path. At least one second pre-filter may be present in said flow path. At least one space with ion-exchange resin may be present in said flow path. The insert may be of an essentially cylindrical shape and be provided with at least one top plate impervious to the liquid and of an essentially circular shape that covers essentially the entire top surface of the cylindrical shape and at least one bottom plate impervious to the liquid and of an essentially circular shape that covers essentially the entire bottom surface of the cylindrical shape, whereby, however, said top plate may be provided with a through hole essentially centrally located. Each one of said at least one first pre-filter, at least one first net, at least one second pre-filter, at least one second net and at least one filter may have an essentially ring-shaped cross section and said at least one space with ion-exchange resin may have a circular cross section, whereby said components may be placed concentrically within each other in said insert allowing the liquid that is to be purified to pass essentially radially into, through and out of the insert, wherein the liquid upon the passage thereof in turn can pass through said at least one first pre-filter, at least one first net, at least one second pre-filter, at least one second net, at least one filter and at least one space with ion-exchange resin.

Thus, the invention also comprises a method of purifying a liquid such as water, preferably drinking water. The liquid is subjected, before purification in filter, to a galvanic current.

The liquid may, before it is subjected to said galvanic current, be filtered in at least one pre-filter. The liquid may, at the same time as it is subjected to said galvanic current, be filtered in at least one pre-filter.

DESCRIPTION OF EMBODIMENTS

Figures 1, 2:
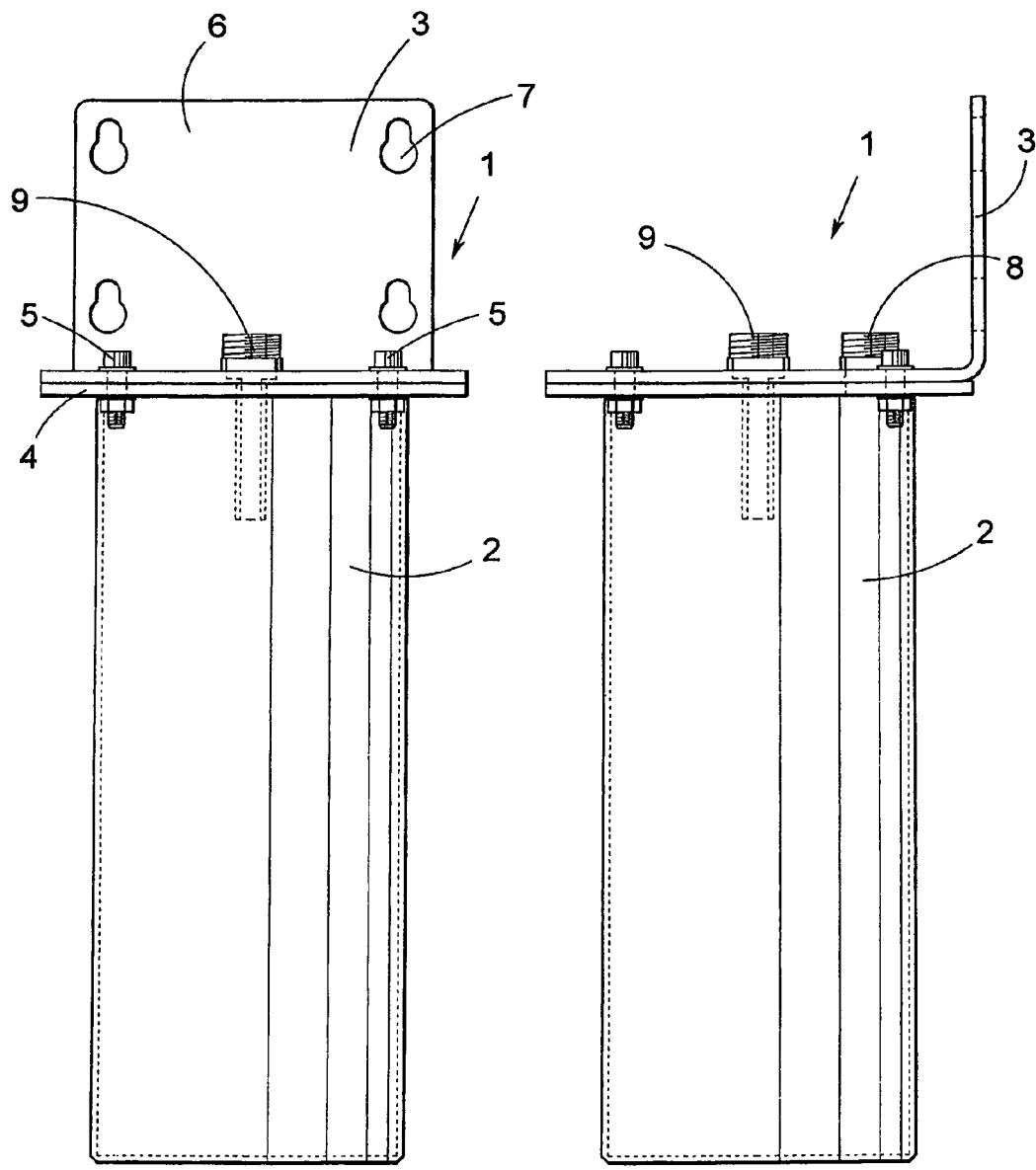
FIG. 1 shows, in a front view, a purification device according to the invention.
FIG. 2 shows, in a side view, the purification device according to FIG. 1.
Figure 3:
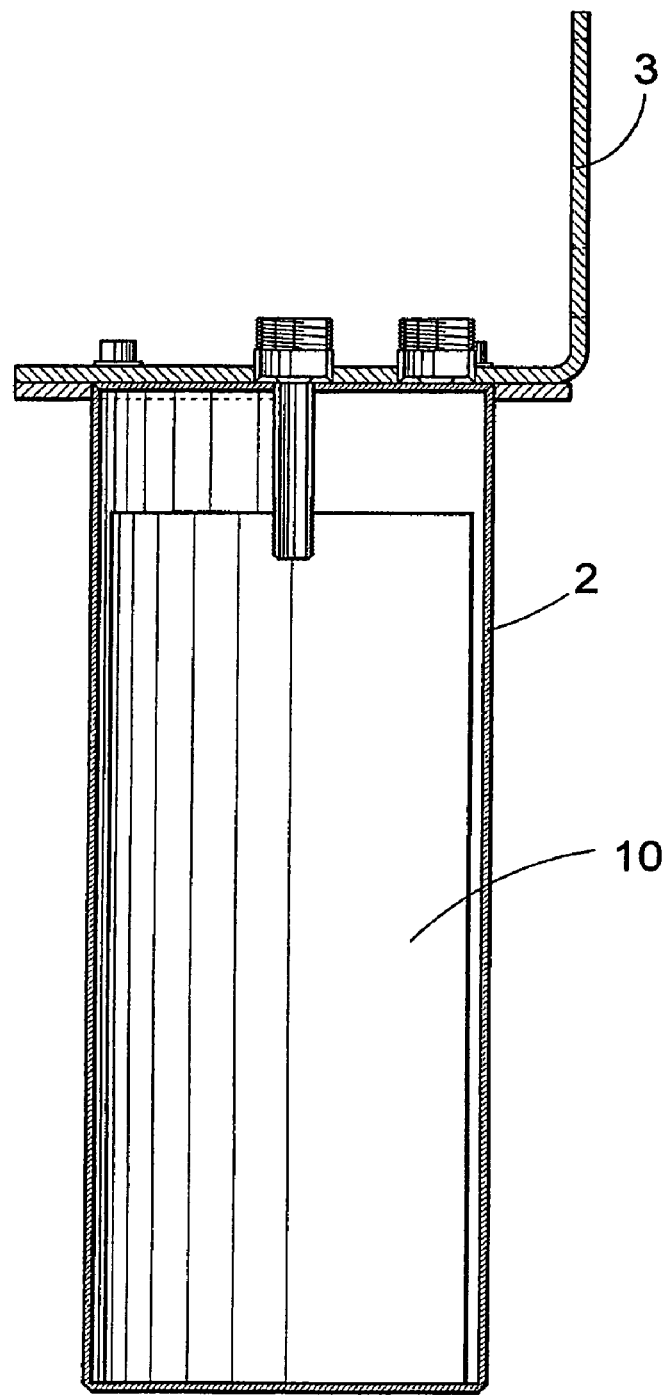
FIG. 3 shows, in a side view and partly in cross-section, the purification device according to FIG. 1.

From the FIGS. 1 and 2, it is evident how the purification device according to the invention appears externally, i.e., a casing 1, preferably of metal such as, for instance, acid-proof stainless steel, and consisting of a bowl part 2 and a cap 3 is evident from the figures. The bowl part 2 is essentially cylindrical in shape and provided with a flange-like edge 4 around the entire upper periphery thereof and the cap 3 is fastened to the bowl part 2 by means of bolts 5 in through holes in the cap 3 and said flange-like edge 4. The cap 3 is provided with an essentially upwardly directed flank 6 provided with four through holes 7 for the mounting of the continuous casing 1 including the contents on a wall or the like lying behind. In the cap 3, there is further found an inlet 8 and an outlet 9, which both are provided with threaded connections in the outer ends thereof facing the surroundings. The fact that the outlet 9 also is provided with a threaded connection in the inner end thereof is seen in FIG. 3, where the purification device is depicted partly in cross-section. The threaded connection in the inner end of the outlet 9 connects to a corresponding thread in a top plate on an insert 10 for filtering in the casing 1.

Figure 4:
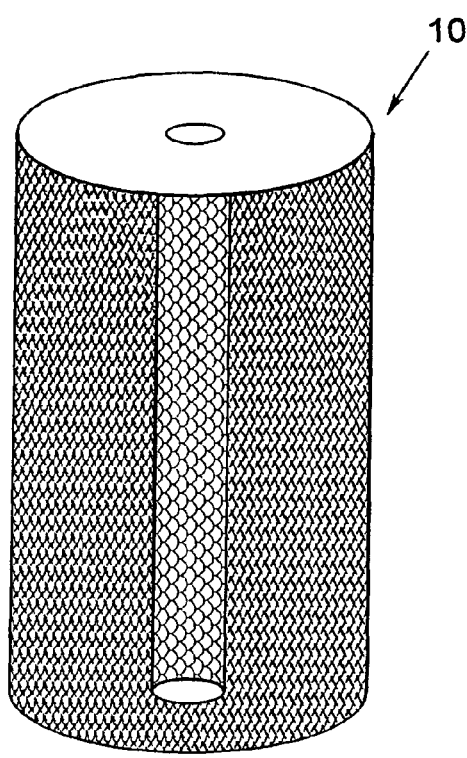
FIG. 4 shows, in perspective view and in principle, an insert included in the purification device according to FIG. 1.
Figure 5:
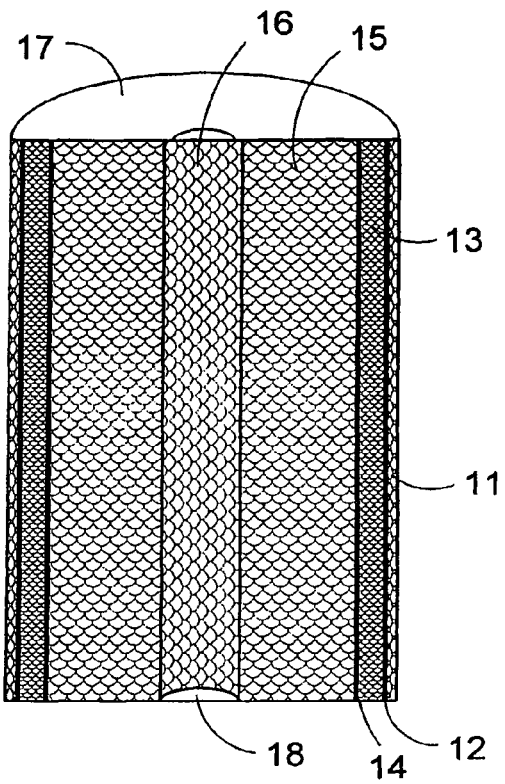
FIG. 5 shows, in perspective view and in cross-section, the insert according to FIG. 4.

From the FIGS. 4 and 5, it is evident how the insert 10 according to the invention appears, FIG. 4 showing the insert 10 externally and in principle, however with an indicated internal space, and FIG. 5 showing the insert 10 in cross-section. The insert 10 is essentially cylindrical in shape and the external dimensions are such that it is well housed in the bowl part 2 in the casing 1, i.e., the outer diameter of the insert 10 is clearly smaller than the inner diameter of the bowl part 2 so that a gap is formed between the inner wall of the bowl part 2 and the outer surface of the insert 10. In practice, the outer diameter of the insert 10 is approx. 70-110 mm, preferably approx. 92 mm, and the height of the insert 10 approx. 240-320 mm, preferably approx. 280 mm.

The insert 10 comprises a first pre-filter 11, a first metal net 12, a second pre-filter 13, a second metal net 14, a filter 15, an inner space 16, a top plate 17 and a bottom plate 18. These components included in the insert 10 are, as is seen in FIG. 5, essentially tubular and placed concentrically around and/or within each other. Each one of the components 11-15 have an essentially ring-shaped cross section in a plane essentially perpendicular to the direction of propagation of the centre axis of the tubular shape. The inner space 16 has an essentially circular cross section in the same plane.

Thus, the first pre-filter 11 is situated farthest out in the insert 10 and consists of cellulose material having a thickness of preferably approx. 3.0 mm and having a porosity that allows particles having a size of approx. 5.0-15.0 μm (micron), preferably approx. 5.0 μm, to pass through. Inside the first pre-filter 11, the first metal net 12 is situated which is 0.5-5.0 mm, preferably 0.5 mm thick, and of copper. Inside the first metal net 12, the second pre-filter 13 is situated, which consists of a compact piece (block) pervious to the liquid and having a thickness of approx. 10-16 mm, preferably approx. 10 mm, and manufactured from powdered activated carbon impregnated with silver and mixed with thermoplastic adhesive. The second pre-filter 13 has a porosity that allows particles having a size of approx. 0.8-5.0 μm, preferably approx. 1.0 μm, to pass through and said carbon is impregnated with approx. 0.3% silver. Inside the second pre-filter 13, the second metal net 14 is situated, which is 0.5-5.0 mm, preferably 0.5 mm thick, and of zinc. Inside the second metal net 14, the principal filter 15 is situated, which consists of a compact piece (block) pervious to the liquid and having a thickness of approx. 12-32 mm, preferably approx. 22 mm, and manufactured from powdered activated carbon impregnated with silver and mixed with thermoplastic adhesive. The filter 15 has a porosity that allows particles having a size of approx. 0.2-0.4 μm, preferably approx. 0.3 μm, to pass through and said carbon is impregnated with approx. 0.3% silver. Inside the filter 15, the inner space 16 is situated, which is centrally located having a diameter of approx. 30 mm and which is filled with ion-exchange resin or the like. A net is present on top of said ion-exchange resin in order to hold it in place.

On the top side, the insert 10 is covered by the top plate 17, which is impervious to the liquid and which is of an essentially circular shape and which covers the entire top surface of the insert 10 with the exception of the top plate 17 being provided with a central, threaded, through hole, the thread being adapted to co-operate with the thread in the inner end of the outlet 9 in the cap 3. The dimension of the thread is ½"-¾", preferably ¾". The top plate 17 is of any known, expedient material, such as plastic, preferably PVC, and is fastened at the top surface of the insert 10 in any known, expedient way, for instance by gluing. On the underside, the insert 10 is covered by the bottom plate 18, which is impervious to the liquid and which is of an essentially circular shape and which covers the entire bottom surface of the insert 10. The bottom plate 18 is of any known, expedient material, such as plastic, preferably PVC, and fastened at the bottom surface of the insert 10 in any known, expedient way, for instance by gluing.

Figure 6:
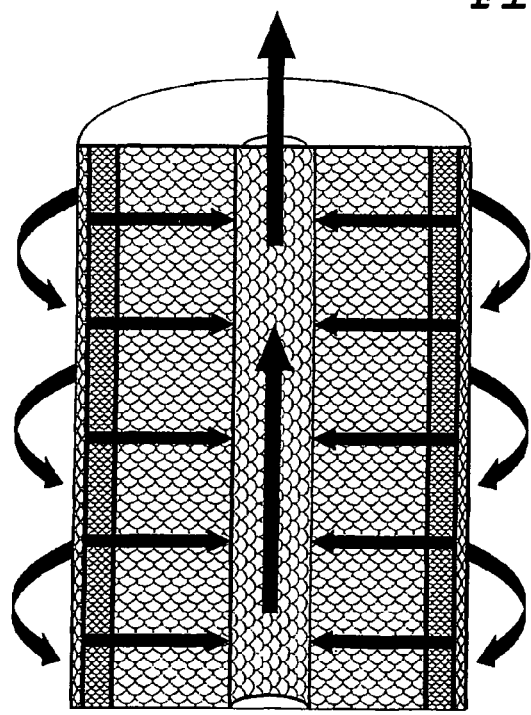
FIG. 6 shows, in perspective view and in cross-section, the insert according to FIG. 4, flow paths being marked with arrows.

The function of the purification device will now be described in more detail in connection with FIG. 6, in which, for the sake of simplicity, the casing 1 has been omitted but where flow paths of the liquid, which is to be purified, are marked with arrows. The liquid enters the purification device through the inlet 8 (FIGS. 1-3) and then flows into the space between the inner wall of the bowl part 2 and the outer surface of the insert 10. After this, the liquid penetrates the different layers of the insert 10 radially from the outside and inwardly. Thus, first the liquid passes through the first pre-filter 11 and then in turn through the first metal net 12, the second pre-filter 13, the second metal net 14, the filter 15 and the inner space 16.

The first pre-filter 11 filters off larger particles in the liquid and consequently extends the service life of the insert 10. The first and second metal nets 12, 14 together constitute a galvanic couple, the liquid upon passage being subjected to a voltage of approx. 1.1 V. This voltage kills micro organisms in the liquid, some of which otherwise would pass through subsequent filters. In the construction shown, the copper net is present outside the zinc net in the insert 10, but a construction where the opposite applies is also feasible and works equally well. At the same time as the liquid passes through the galvanic couple and is subjected to the voltage generated by the same, the liquid also passes through the second pre-filter 13, which filters off all impurities having a size of approx. 1.0-5.0 μm (in the preferred embodiment of the second pre-filter 13). The addition of a bacterial inhibitor, i.e., approx. 0.3% silver, significantly reduces the growth of bacteria. The principal filter 15 filters all remaining impurities having a size of larger than 0.3 μm (in the preferred embodiment of the filter 15), which comprises 99% of all impurities. The addition of a bacterial inhibitor, i.e., approx. 0.3% silver, significantly reduces the growth of bacteria. The ion-exchange resin in the inner space 16 guarantees that the small quantity of heavy metals that manage to pass existing filters are captured.

Since the inner space 16, through the threaded hole in the top plate 17, connects to the outlet 9 in the cap 3, the liquid, after having passed through the insert 10, can flow through the outlet 9 out of the purification device. From here, in the case of purification of tap water, the water can flow in pipes (not shown) to a nearby place of consumption (not shown) of tap water. The purification device is to be connected on the cold-water side in a consumption plant.

Thus, under radial flow conditions, as those according to the present invention, the liquid enters through the entire, preferably vertical, envelope surface of the cylindrical insert 10 and then flows through the wall of the insert 10 into an inner space 16, which in turn leads out of the insert 10. In comparison with an axial filter having the same outer dimensions, the insert 10 for radial flow has a ratio of outer area to flow that is ten times larger. The flow depth is the total wall thickness of the insert 10. This combination of larger flow area and smaller flow depth means that the pressure that is required to drive a radial flow filter is approx. 100 times lower than what applies for the corresponding axial-flow filter. In an extruded carbon filter, it is possible to benefit by this by using activated carbon for much finer grain size than otherwise without obtaining considerable pressure drop when using the filter. The finer grain size involves highly improved performance of the filter in comparison with filter for thick grains.

The purification device according to the invention implies, among other things, the following advantages. The unique shape of the insert 10 maximizes the time the liquid is in contact with the extruded carbon filter, which optimizes the filtration capacity. The exceptionally high density in the carbon filter also contributes to this. The large envelope surface on the insert 10 that allows inflow of liquid contributes to the fact that a large quantity of liquid passes through the insert 10 in parallel, which maximizes the flow velocity through the filter. The top and bottom plates of PVC prevents leakage of contaminated liquid to filtered liquid, something which otherwise is very common. The addition of bacterial inhibitor reduces the growth of bacteria significantly and counteracts clogging of the envelope surface of the insert 10.

The purification device according to the invention has an exceptional filtration capacity. The same, in the form of the number of impurities, etc. that are filtered off, increases logarithmically with the density in the carbon filter. The flow velocity through the purification device is also exceptional or approx. 10-15 l/min. The insert 10 has a total capacity of approx. 36,000 l. The filtration capacity is altered only marginally over the time of usage.

Neither the casing 1 nor the insert 10 needs of necessity to be of cylindrical shape, but other geometrical shapes are also feasible. Neither is it necessary to use the casing 1 with the insert 10 in the vertical position that is seen in the figures, but usage in leaning position or even upside down is feasible. It is also feasible to use the insert 10 in other positions in the casing 1 than what is seen in the figures, for instance in such a way that the top plate 17 with the through hole thereof instead constitutes bottom plate at the same time as the bottom plate 18 constitutes top plate, occurring connections between the insert 10 and the casing 1 having been modified in an analogous suitable way in relation to what is seen in the figures. When it is stated in the text that a certain pre-filter or filter allows particles of a certain given size to pass, it means that larger particles than that cannot pass through the pre-filter or the filter in question.

Figure 7:
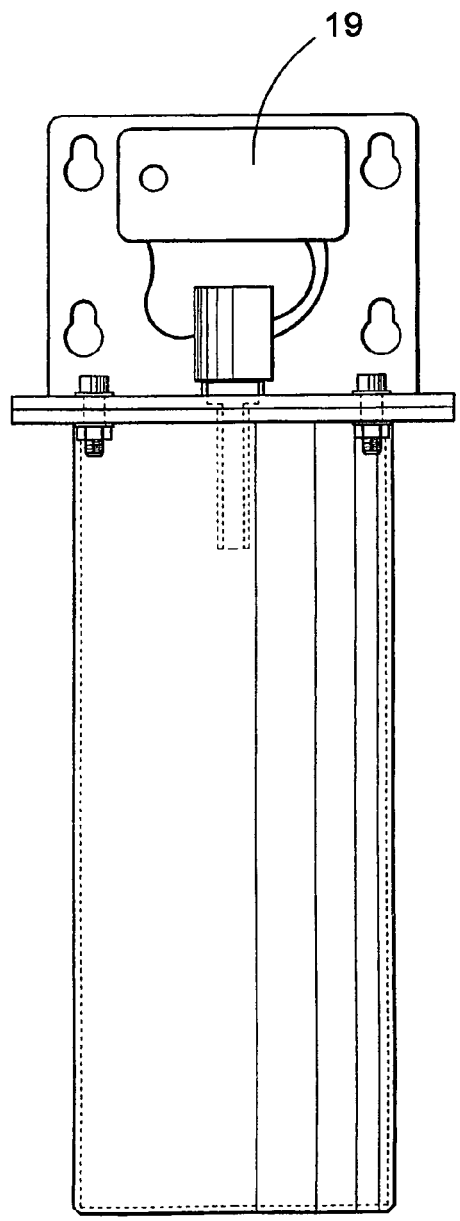
FIG. 7 shows, in a front view, the purification device according to FIG. 1 provided with a control box.
Figure 8:
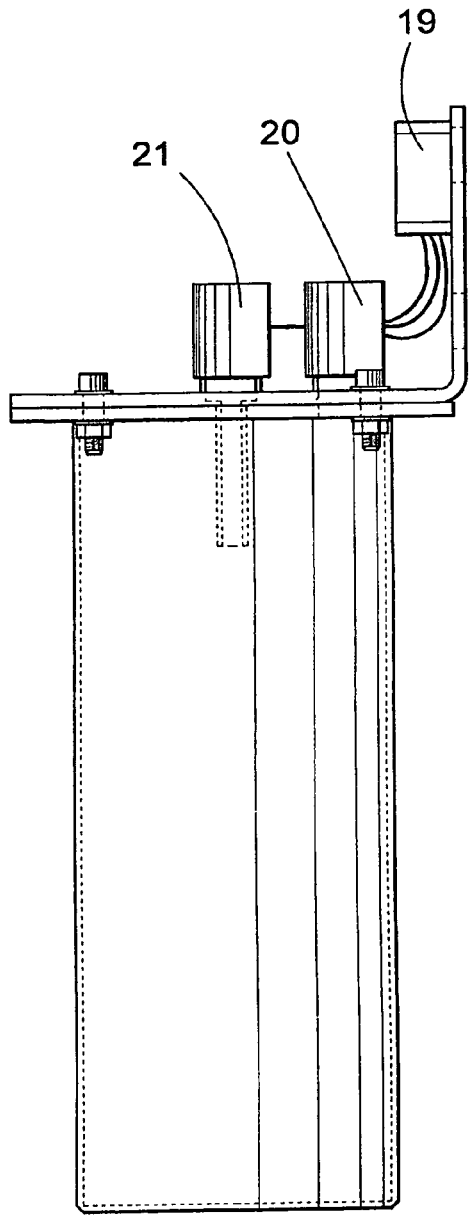
FIG. 8 shows, in a side view, the purification device according to FIG. 7.

In FIGS. 7 and 8, it is seen how the purification device according to the invention may be provided with a control box 19, which is fastened at said flange-like edge 4. Control equipment in the control box 19 may comprise at least one pressure gauge for the inlet side of the liquid, at least one pressure gauge for the outlet side of the liquid, at least one generator for a rechargeable battery and driven by liquid flow through the purification device, at least one rechargeable battery, at least one indicator of LED type, at least one signal-processing equipment as well as at least one equipment for communication via GSM, GPRS, 3G, radio and/or tele. Said pressure gauge for the inlet side of the liquid is connected to at least one pressure sensor 20 in said inlet 8 and said pressure gauge for the outlet side of the liquid is connected to at least one pressure sensor 21 in said outlet 9.

The control box 19 operates in the following way. When the purification device is used, the pressure on the liquid that comes from the purification device decreases in course of time. The control box 19 indicates when the insert 10 in the purification device needs to be exchanged. The control box 19 measures the difference in pressure between the liquid that enters the purification device and the liquid that leaves it. When the difference in pressure is larger than a certain amount, the control box 19 activates the red LED light and transmits, via the equipment for communication, a signal to a computer at a service company. The equipment for communication needs an electrical voltage in order to work. This is generated by the generator, which charges the battery in the control box 19. The generator is connected with a small propeller in the liquid inlet, but the propeller may equally well be positioned in another suitable place. A control box 19 of the described type, and having the corresponding function, may also be used in combination with any one of previously known purification devices.

The invention is not limited to the embodiments shown here but may be varied within the scope of the appended claims.

The invention claimed is:

1. A purification device for the purification of a liquid such as water which comprises at least one casing having at least one insert, said casing having at least one inlet and at least one outlet for the liquid and said insert comprising at least one filter located in a flow path of the liquid, the purification device further comprising at least one galvanic couple located in said flow path, wherein said at least one filter is located downstream of said at least one galvanic couple in said flow path and consists of at least one compact piece pervious to the liquid and manufactured from powdered activated carbon whereby said at least one filter is located in said at least one galvanic couple, which galvanic couple is comprised of at least two nets of metal located at a distance from each other, making it possible for the liquid that is to be purified to pass through said at least one inlet into said casing and further radially from the outside and inwardly into, through and out of said at least one galvanic couple and further radially from the outside and inwardly into, through and out of said at least one filter and further through said at least enone outlet and out of said casing.

2. The purification device according to claim 1, wherein said insert comprises at least one galvanic couple located in said flow path, which galvanic couple comprises at least two nets of metal located at a distance from each other.

3. The purification device according to claim 2, wherein at least a first one of said nets is of copper and at least a second one of said nets is of zinc.

4. The purification device according to claim 1, wherein a least one first pre-filter is present in said flow path.

5. The purification device according to claim 4, wherein said at least one first pre-filter is present upstream said galvanic couple in said flow path.

6. The purification device according to a claim 4, wherein said at least one first pre-filter is of cellulose material having a porosity that allows particles having a size of approx. 5.0-15.0 pm to pass through.

7. The purification device according to claim 4, wherein at least one second pre-filter is present in said flow path.

8. The purification device according to claim 7, wherein said at least one second pre-filter is present between said nets in said flow path.

9. The purification device according to claim 7, wherein said at least one second pre-filter consists of at least one compact piece pervious to the liquid and manufactured from powdered activated carbon impregnated with silver and mixed with thermoplastic adhesive.

10. The purification device according to claim 9, wherein said at least one second pre-filter has a porosity that allows particles having a size of approx. 0.8-5.0 pm to pass through and said carbon is impregnated with approx. 0.3% silver.

11. The purification device according to claim 1, wherein said powdered activated carbon is impregnated with silver and mixed with thermoplastic adhesive.

12. The purification device according to claim 11, wherein said at least one filter has a porosity that allows particles having a size of approx. 0.2-0.4 pm to pass through and said carbon is impregnated with approx. 0.3% silver.

13. The purification device according to claim 1, wherein at least one space with ion-exchange resin is present in said flow path.

14. The purification device according to claim 13, wherein said space is present downstream of said galvanic couple in said flow path.

15. The purification device according to claim 8, wherein said insert, in addition to said filter, also comprises said first and second pre-filters and said galvanic couple.

16. The purification device according to claim 1, wherein said insert is of an essentially cylindrical shape and is provided with at least one top plate impervious to the liquid and of an essentially circular shape and that covers essentially the entire top surface of the cylindrical shape and at least one bottom plate impervious to the liquid and of an essentially circular shape and that covers essentially the entire bottom surface of the cylindrical shape, however, said top plate being provided with a through hole essentially centrally located.

17. The purification device according to claim 16, wherein each one of said at least one first pre-filter, at least one first net, at least one second pre-filter, at least one second net and at least one filter has an essentially ring-shaped cross section and said at least one space with ion-exchange resin has an essentially circular cross section, said components being placed concentrically within each other in said insert allowing the liquid that is to be purified to pass through said at least one inlet into said casing and further essentially radially into, through and out of said insert as well as further through said at least one outlet out of said casing, the liquid upon the passage thereof through said insert in turn passing through said at least one first pre-filter, at least one first net, at least one second pre-filter, at least one second net, at least one filter and at least one space with ion-exchange resin.

18. The purification device according to claim 1, which has a control equipment that comprises at least one pressure gauge for the inlet side of the liquid, at least one pressure gauge for the outlet side of the liquid, at least one generator for a rechargeable battery and driven by liquid flow through the purification device, at least one rechargeable battery, at least one indicator of LED type or the like, at least one signal-processing equipment as well as at least one equipment for communication via Global System for Mobile communication (GSM), General Packet Radio Service (GPRS), Third Generation mobile telephony (3G), radio, telecommunication network (tele) and/or the like.

19. The purification device according to claim 1, wherein said at least one casing constitutes a cathode, said cathode constituting a part of a circuit fed from an external power supply.

20. The purification device according to claim 1, wherein said at least one insert comprises an anode located in said flow path, said anode constituting a part of a circuit fed from an external power supply.

21. The purification device according to claim 20, wherein said anode is made of a valve metal.

22. An insert for use in a purification device according to claim 1, comprising at least one filter located in a flow path of a liquid, the insert further comprising at least one galvanic couple located in said flow path wherein said at least one filter is located downstream of said at least one galvanic couple or said anode in said flow path and consists of at least one compact piece pervious to the liquid and manufactured from powdered activated carbon, whereby said at least one filter is located in said at least one galvanic couple, which galvanic couple is comprised of at least two nets of metal located at a distance from each other, making it possible for the liquid that is to be purified to pass radially from the outside and inwardly into, through and out of said at least one galvanic couple and further radially from the outside and inwardly into, through and out of said at least one filter.

23. The insert according to claim 22, comprising at least one galvanic couple located in said flow path, which galvanic couple shows at least two nets of metal located at a distance from each other.

24. The insert according to claim 23, wherein at least a first one of said nets is of copper and at least a second one of said nets is of zinc.

25. The insert according to claim 24, wherein at least one first pre-filter is present in said flow path.

26. The insert according to claim 25, wherein at least one second pre-filter is present in said flow path.

27. The insert according to claim 26, wherein at least one space with ion-exchange resin is present in said flow path.

28. The insert according to claim 27, which is of an essentially cylindrical shape and is provided with at least one top plate impervious to the liquid and of an essentially circular shape that covers essentially the entire top surface of the cylindrical shape and at least one bottom plate impervious to the liquid and of an essentially circular shape that covers essentially the entire bottom surface of the cylindrical shape, however, said top plate being provided with a through hole essentially centrally located.

29. The insert according to claim 27, wherein each one of said at least one first pre-filter, at least one first net, at least one second pre-filter, at least one second net and at least one filter has an essentially ring-shaped cross section and said at least one space with ion-exchange resin has an essentially circular cross section, said components being placed concentrically within each other in said insert allowing the liquid that is to be purified to pass essentially radially into, through and out of the insert, the liquid upon the passage thereof in turn passing through said at least one first pre-filter, at least one first net, at least one second pre-filter, at least one second net, at least one filter and at least one space with ion-exchange resin.

30. A method of purifying a liquid such as water using a purification device according to claim 1, which purification device comprises at least one casing having at least one insert, said casing having at least one inlet and at least one outlet for the liquid and said insert comprising at least one filter located in a flow path of the liquid, the purification device further comprising at least one galvanic couple located in said flow path, wherein the liquid, before purification in said filter in the form of at least one compact piece pervious to the liquid and manufactured from powdered activated carbon, is subjected to a galvanic current, whereby the liquid is brought to pass through said at least one inlet into said casing and further radially from the outside and inwardly into, through and out of said at least one galvanic couple and further radially from the outside and inwardly into, through and out of said at least one filter and further through said at least one outlet and out of said casing.

31. A method according to claim 30, wherein the liquid, before it is subjected to said galvanic current, is filtered in at least one pre-filter.

32. The method according to claim 31, wherein the liquid, at the same time as it is subjected to said galvanic current, is filtered in at least one pre-filter.

\* \* \* \* \*

UNITED STATES PATENT AND TRADEMARK OFFICE
CERTIFICATE OF CORRECTION

| | | |
|---|---|---|
| PATENT NO. | : 7,972,519 B2 | |
| APPLICATION NO. | : 11/631321 | |
| DATED | : July 5, 2011 | |
| INVENTOR(S) | : Paul Koos, Robert Hahmann and Paulina Koos | |

It is certified that error appears in the above-identified patent and that said Letters Patent is hereby corrected as shown below:

Column 7, line 45, replace "enone" with -- one --
Column 7, line 62, replace "pm" with -- µm --
Column 8, line 8, replace "pm" with -- µm --
Column 8, line 16, replace "pm" with -- µm --
Column 9, line 11-12, delete "or said anode"

Signed and Sealed this
Twenty-fourth Day of April, 2012

David J. Kappos
*Director of the United States Patent and Trademark Office*